United States Patent [19]
Baba et al.

[11] Patent Number: 5,526,442
[45] Date of Patent: Jun. 11, 1996

[54] X-RAY RADIOGRAPHY METHOD AND SYSTEM

[75] Inventors: Rika Baba, Kokubunji; Ken Ueda, Ome; Hisatake Yokouchi, Tokyo; Keiji Umetani, Hino; Yoichi Onodera, Asaka, all of Japan

[73] Assignee: Hitachi Medical Corporation, Tokyo, Japan

[21] Appl. No.: 317,748

[22] Filed: Oct. 4, 1994

[30] Foreign Application Priority Data

Oct. 4, 1993 [JP] Japan ................................ 5-247983
Dec. 28, 1993 [JP] Japan ................................ 5-336589

[51] Int. Cl.$^6$ .................................................. G06K 9/00
[52] U.S. Cl. .......................................... 382/132; 382/293
[58] Field of Search ........................ 364/413.01, 413.02, 364/413.04, 413.06, 413.13, 413.14, 413.15, 413.16, 413.19, 413.22, 413.23, 413.24; 378/207, 89, 98; 382/128, 130, 131, 132, 154, 190, 282, 285, 293, 294, 295

[56] References Cited

U.S. PATENT DOCUMENTS

| | | | |
|---|---|---|---|
| 4,672,559 | 6/1987 | Jansson et al. | 364/525 |
| 4,868,747 | 9/1989 | Mori et al. | 364/413.18 |
| 5,229,618 | 7/1993 | Nakajima | 250/559 |
| 5,231,673 | 7/1993 | Elenga | 382/6 |
| 5,263,074 | 11/1993 | Sakamoto | 378/99 |
| 5,331,553 | 7/1994 | Muehllehner et al. | 364/413.24 |
| 5,375,156 | 12/1994 | Kuo-Petravic et al. | 378/9 |
| 5,396,347 | 3/1995 | Kaneko | 358/448 |

FOREIGN PATENT DOCUMENTS

| | | |
|---|---|---|
| 60-50900 | 3/1985 | Japan . |
| 2-10636 | 1/1990 | Japan . |
| 5-28316 | 4/1993 | Japan . |

OTHER PUBLICATIONS

Rika Baba; Chest Radiography using Parcial Exposure and Imaging Synthesis; Japanese Journal of Medical Electronic and Bio. Eng. vol. 31, p. 209, May 1993.
Fundamentals of Medicine and Pharmacy I; p. 123 (1981).

*Primary Examiner*—Joseph Mancuso
*Attorney, Agent, or Firm*—Antonelli, Terry, Stout & Kraus

[57] ABSTRACT

An X-ray radiography method and apparatus in which a phantom such as a chart having elements arranged in predetermined positions is irradiated with X-rays and an X-rays detection unit detects signals thereof. An image of the chart is obtained and a center position of each of the elements in the image of the chart is obtained as well as for those elements which are not within the imaging field of view. Pixel positions for a distortion free image is obtained and a transform table is prepared making each of the pixel positions in the image of the chart correspond to each of the pixel positions in the distortion free image. A plurality of digital images of a subject to be examined are obtained and the digital images are corrected in accordance with the transform table. The corrected digital images are then joined together and a digital image is displayed, wherein common portions in the corrected images are in accordance with each other.

11 Claims, 11 Drawing Sheets

X-RAY RADIOGRAPHY METHOD AND SYSTEM

CROSS REFERENCE TO RELATED APPLICATIONS

The present invention is related copending U.S. application Ser. No. 08/186,471 filed on Jan. 26, 1994 and Ser. No. 08/240,313 filed May 10, 1994, and the subject matter thereof is incorporated herein by reference.

BACKGROUND OF THE INVENTION

The present invention relates to a digital X-ray radiography method suitable for imaging a large view field such as a chest and an apparatus for realizing same and in particular to a method for correcting image distortion useful for correcting with a high precision image distortion produced in case where an imaging unit such as an image intensifier, etc. is used and an apparatus for realizing same.

As a method for obtaining an X-ray image by imaging a chest several times, dividing it into a plurality of parts, while varying a relative position of an X-ray detecting unit with respect to an a subject body, heretofore there is known a technique described e.g. in "Japanese Journal of Medical Electronics and Biological Engineering", Vol. 31, Special Issue (Proceedings of the 32nd Conference, Japan Society of Medical Electronics & Biological Engineering), p. 209, May 1993. This technique is a method, by which an X-ray television camera consisting of an X-ray image intensifier and a television camera is used as an X-ray detection unit; a subject body to be imaged is standing; an X-ray source is fixed; and the X-ray detection unit is translated parallelly on a straight line in one direction with respect to the subject body, and by which a right and a left lung are imaged separately and an image synthesized by joining two images thus obtained is displayed.

Further, as a method for obtaining an X-ray image in synchronism with a variation in an electrocardiogram, there is known an angiographic technique described e.g. in JP-A-60-50900.

Furthermore, heretofore, it is widely known that a pin-cushion type distortion is produced in an obtained image, in case where imaging is effected by using an imaging unit such as an image intensifier, etc. in a radiography system.

In a radiography system, the pin-cushion type distortion characteristics vary, depending on the distance between an X-ray tube and an X-ray image intensifier. As a technique for suppressing variations in these pin-cushion type distortion characteristics, there is known a technique described in JP-A-2-10636. By this technique variations in the characteristics of the pin-cushion type distortion produced by variations in the distance between the X-ray tube and the X-ray image intensifier are cancelled by controlling potential applied to electrodes disposed in the neighborhood of an output phosphor screen of the image intensifier.

Further, as a method, by which distortion in an image itself obtained by the imaging is not suppressed as by the technique described above but the obtained image is corrected in an electronic manner, there is known a technique described in JP-U-5-28316. By this technique an equidistantly partitioned rectangular chart is imaged; sampling points are manually inputted by means of a digitizing system, a mouse, etc.; a characteristic curve representing the pin-cushion type distortion obtained by starting from distortions at the sampling points is approximated by the minimum square method; and an approximation formula thus obtained is applied to all the points of the image, in which the pin-cushion type distortion exists, to correct the pin-cushion type distortion.

SUMMARY OF THE INVENTION

When a chest is imaged several times, generally the shape of the heart differs in a plurality of images due to pulse of the heart and therefore also positions of the mediastinum and the lungs differ. As the result, an image discontinuity, for example, the difference between the edge position of the heart on the right image and that on the left image, takes place at junctions in a joined image. Such a joined image gives rise to inconveniences in diagnosis.

By the method described in JP-A-2-10636 cited previously for suppressing variations in the pin-cushion type distortion characteristics, since it is necessary to adjust the potential applied to the electrodes, every time the distance between the X-ray tube and the X-ray image intensifier is varied and also every time the electronic view field is enlarged, much time and work are required. Therefore it is very troublesome to realize this method.

Further, by the method described in JP Utility Model-A-Hei5-28316 cited previously, by which images are corrected in an electronic manner, since the sampling points are inputted manually by means of the digitizing system or the mouse, it is difficult to measure distortion with a high precision and also automation thereof is difficult.

Furthermore, by the two prior art techniques it is difficult to correct distortion so that the error of distortion correction is less than one pixel size on the whole image. Therefore the prior art techniques are hardly applied to image processing, for which precise distortion correction is required, such as joining of images obtained by a plurality of imagings or reconstruction of a three-dimensional image.

The present invention has been made in view of the situation described above and the object thereof is to provide an X-ray radiography method capable of solving the problems of the prior art techniques as described above, by which it is possible to obtain a plurality of images in same phase stages as cardiac movement and to effect joining of images with a high precision by eliminating discontinuity at areas around joining lines in a joined image and a chest having an area larger than a view field of an X-ray detector can be imaged with a high spatial resolving power by carrying out image distortion correction processing in a region reaching ends of the view field of the X-ray detector so that the images hold precise positional information over the whole view field of the X-ray detector, and a system for realizing same.

An X-ray radiography method according to the present invention is characterized in that a plurality of images are obtained, for each of which either one of the lung and the mediastinum of a subject to be examined are in the imaging view field, a plurality of images thus obtained are joined to be displayed, and the plurality of images are obtained in a predetermined same phase stage of an electro-cardiographic signal.

Further it is characterized in that it comprises a step of irradiating a phantom consisting of a plurality of objects for example, holes on a hole chart to be examined disposed at known positions with X-ray, detecting X-ray transmitted through the phantom by means of an X-ray detection unit, and obtaining an image of the phantom by digitizing detected signals output from the detection unit; a step of obtaining coordinates of a center position of each of the plurality of objects in the image of the phantom; a step of obtaining coordinates in the image of the phaeton of a center position of each of virtual objects being virtually outside of the imaging view field of the X-ray detection unit in the fourth embodiment by calculation using the coordinates of center positions of the plurality of objects; a step of determining correspondence between the coordinates of the center position of each of the objects and the virtual objects and coordinates of pixels in a distortion free image; a step of obtaining positional coordinates in the image of the phantom of each of the pixels in a distortion free image by calculation using the coordinates of the center positions of the objects, the virtual bodies and preparing a transform table which shows the correspondence between the positional coordinates calculated using coordinates of the center positions of the objects of the phantom and the virtual objects being virtually outside of the imaging view field of the X-ray detection unit and the positional coordinates calculated using the coordinates in a distortion free image; a step of obtaining a plurality of digital images relating to a subject to be examined in a predetermined same phase stage of an electrocardiographic signal; a step of correcting, according to the transform table, image distortion in the digital images by transforming each of the plurality of digital images relating to the subject to be examined; a step of joining a plurality of digital images thus corrected to each other; and a step of displaying a digital image obtained by joining them.

Furthermore, more in detail, each of the plurality of images is obtained in such a manner that a single lung and the mediastinum of the subject to be examined are in the imaging view field of the X-ray detection unit described above and the predetermined phase stage of the electrocardiographic signal is set at a telesystolic stage (an end of the systolic stage). The center positions of the plurality of objects constituting the phantom are arranged on one straight line and the coordinates of the center position of each of the plurality of objects are made correspond to those of either one of the pixels in the image after the image distortion correction. The center positions of the plurality of objects are arranged on one straight line; the phantom is disposed so that the positional coordinates of each of them are made correspond to those of the center of either one of pixels of the image after the image distortion correction; images of the phantom is obtained by means of a unit comprising an X-ray image intensifier and a television camera; and the straight line described previously is parallel or perpendicular to the scanning direction of the television camera. As the result, preparation of the transform table is remarkably simplified.

The center positions of the plurality of objects constituting the phantom may be arranged on a plurality of straight lines disposed radially passing through a point.

The phantom is a plate having a plurality of holes, through which X-ray passes and made of a material interrupting (attenuating) X-ray or a plate transmitting X-ray, on which a plurality of objects made of a material interrupting (attenuating) X-ray, the cross-section of each of which is axially symmetric, are disposed. As the result, it is possible to obtain a phantom image having a high contrast of the plurality of objects, whose position is known, with respect to the background.

Still further, the X-ray imaging method according to the present invention is characterized in (1) that the plurality of digital images relating to the subject to be examined are images obtained at different positions by moving the position of the X-ray detection unit with respect to the X-ray source and that it is possible to obtain a synthesized image by joining a plurality of images, for which image distortion is corrected, so that portions included in common in corrected images are in accordance with each other; (2) that the plurality of digital images relating to the subject to be examined are images obtained at different positions by moving the X-ray source and the X-ray detection unit in synchronism with each other and a synthesized image is obtained by joining a plurality of images, for which image distortion is corrected, so that portions included in common in corrected images are in accordance with each other; and (3) that the plurality of digital images relating to the subject to be examined are images obtained at different positions while moving the X-ray source and the X-ray detection unit on a circle surrounding the subject to be examined in synchronism with each other and that a tomographic image can be obtained by reconstructing it three-dimensionally by joining a plurality of images, for which image distortion is corrected. Owing to these characteristics distortion can be corrected up to end portions of the view field and thus it is possible to obtain an image over the whole view field with a correct positional relation. As the result, joining of the plurality of images can be carried out with a high precision and thus it is possible to obtain an image, in which the plurality of images are joined precisely in a wide region. Further, at reconstructing a three-dimensional image, it is possible to prepare a precisely reconstructed image by using the whole view field.

By the X-ray radiography method according to the present invention, since a plurality of imagings are effected in a predetermined same phase stage of an electrocardiographic signal, movement of the heart, the mediastinum and the lungs accompanied by pulse of the heart during the plurality of imagings is compensated and thus precision of joining of images is improved.

In particular, since owing to the fact that image is obtained in a state where the phase stage the electrocardiographic signal is at a telesystolic stage (an end of the systolic stage), cardiac movement is slowest and, the heart and the chest accompanied by pulsation of the heart during irradiation with X-ray is smallest. As the result, it is possible to obtain a clear image. Further, since the volume of the heart is smallest, the part in the lung field, on which the heart is superposed in the image, is also smallest and as the result power of detecting lesions in the lung field is increased.

As explained in detail in the above, according to the present invention, remarkable effects can be obtained that joining of images can be effected with a high precision by avoiding deformation of the heart, etc. in a plurality of images and eliminating discontinuity at areas around joining lines and that it is possible to image a chest with a high spatial resolution in a region larger than the view field of the X-ray detection unit.

An X-ray radiography system according to the present invention having an X-ray source; an X-ray slit which restricts X-ray beam from the X-ray source; an X-ray grid for interrupting scattered X-ray; an X-ray detection unit for detecting X-ray transmitted through the subject to be examined; a moving mechanism for moving at least the X-ray detection unit; a signal processing unit for collecting output signals from the X-ray detection unit, which signals are subjected to calculation processing in order to obtain an X-ray image of a subject to be examined; and a display unit for displaying the X-ray image of the subject to be examined, which is a result of calculation of the signal processing unit, in which the X-ray detection unit is an X-ray camera consisting of an X-ray image intensifier and a television camera; a first image is obtained, putting a single lung and a mediastinum of the subject to be examined in a view field; subsequently the detecting unit is moved to such a position that the other single lung and the mediastinum are put in the view field and a second image is obtained, after movement has been terminated; and two images obtained by the two imagings are joined and displayed, is characterised in that it comprises further means for controlling the system so that the two images are obtained in a predetermined same phase stage of an electrocardiographic signal and that imaging control means controls it so that the images are obtained in a state where the phase stage of the electrocardiographic signal is at a telesystolic stage (an end of systolis). Further it is characterized also in that an image pick-up tube is used for the television camera and that reading out of the second image is carried out after a predetermined period of time of a state where scanning for reading out an electron beam is stopped has lapsed or in that a CCD camera is used for the television camera and that reading out of the image is carried out at the same time as movement of the detection unit.

Furthermore an X-ray radiography system according to the present invention is characterized in that it comprises an X-ray source, which irradiates a phantom which consists of plural objects whose position is already known with X-ray; an X-ray detection unit for detecting X-ray transmitted through the phantom; an imaging unit for imaging the phantom by digitizing detection signals obtained by the X-ray detection unit; and an image processing unit for subjecting data of the phantom image and a plurality of digital images relating to the subject to be examined to calculation processing and that the image processing unit includes means for obtaining coordinates of a center position of each of the plurality of objects to be examined in the image of the phantom; means for obtaining coordinates of center positions of virtual objects being virtually in outside of the imaging view field of the X-ray detection unit by calculation using the coordinates of center positions of the plurality of objects; means for determining to positional coordinates of which pixel in a distortion free image the coordinates of the center position of each of the objects and the virtual objects correspond; means for obtaining positional coordinates of each of the pixels within the imaging view field of the distortion free image by calculation using the coordinates of the center positions of the objects and virtual objects and preparing a transform table making the positional coordinates of the phantom image correspond to the positional coordinates of each of the pixels in the distortion free image; and means for correcting image distortion in the digital images by transforming each of the plurality of digital images relating to the subject to be examined, in which the imaging unit has a television camera using a semiconductor element for an imaging element.

In the X-ray radiography system according to the present invention, it is possible to carry out e.g. a high speed imaging with 1050 scanning lines or a superfine imaging with 2100 scanning lines by selecting a camera mode by using an image pick-up tube for the television camera. Further it is possible to avoid worsening in image quality due to microphonic noise produced by movement of the detection unit by effecting reading out of a second image after a predetermined period of time of a state where scanning for reading out an electron beam is stopped has lapsed.

In the X-ray radiography system according to the present invention, in case where a CCD camera is used for the television camera, no microphonic noise is produced even at moving the detection unit, reading out of the image and the movement of the detection unit can be carried out simultaneously directly after a first imaging and as the result, time interval between the first imaging and the second imaging can be shortened so that images can be obtained in synchronism with successive pulses.

The present invention can be summarized as follows. At first, a phantom which consists of plural objects whose position is already known is imaged to obtain a phantom image generally distorted. Then coordinates of the central position of each of the plurality of objects in the phantom image thus obtained are obtained and coordinates of a center position of each of virtual objects being virtually outside of a field of view are determined, by calculation using these coordinates of the center positions. Further it is determined correspondence between the coordinates of the center positions of the object bodies and the virtual object bodies and pixels in a not distortion free image and a transform table for making the positional coordinates in the phantom image correspond to the coordinates of each pixel in the distortion free image is prepared by obtaining the positional coordinates in the phantom image corresponding to the positional coordinates of all the pixels within the view field of the X-ray detection unit by calculation using the coordinates of the center positions of the objects and the virtual objects described above. Distortion in the images is corrected, by referring to the transform table, by transforming each of the plurality of images relating to a subject to be examined, made separately. The plurality of images relating to the subject to be examined are obtained by at least two imagings, putting each of the single lungs and the mediastinum of the subject to be examined in the view field. This plurality of images are obtained in a predetermined same phase stage of an electrocardiographic signal. In this way joining of at least two images thus obtained can be effected with a high precision and a subject part to be examined having an area larger than the view field of the X-ray detection unit can be imaged by X-ray with a high spatial resolution.

DESCRIPTION OF THE PREFERRED EMBODIMENTS

Figure 1:
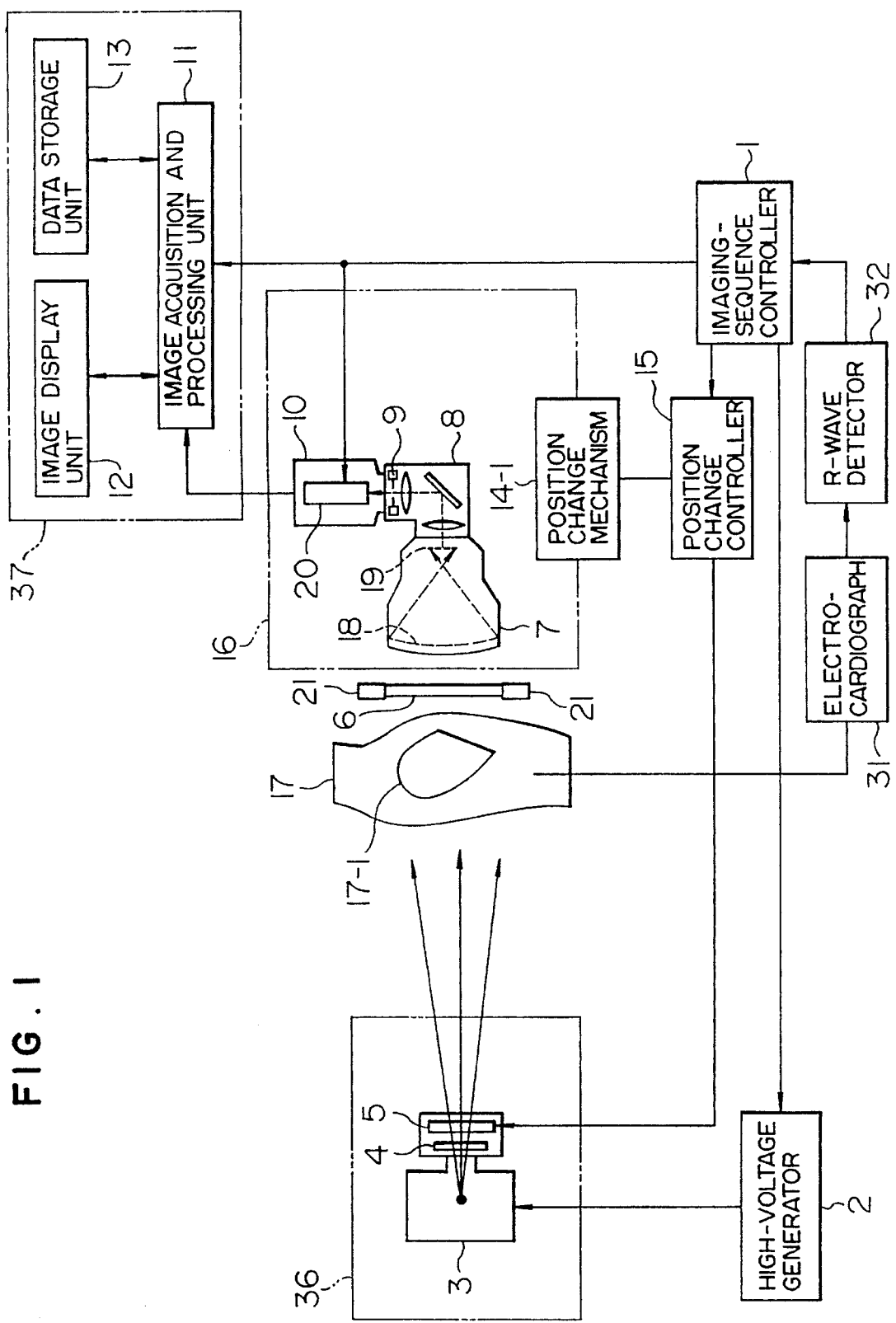
FIG. 1 is a schematical side view indicating the construction of a digital X-ray radiography system according to a first embodiment, to which the present invention is applied.

Hereinbelow several embodiments of the present invention will be explained in detail, referring to the drawings.
(1st EMBODIMENT)

FIG. 1 is a schematical side view indicating the construction of a digital X-ray radiography system for chest, to which the present invention is applied. The X-ray radiography system according to the present embodiment is composed of an imaging-sequence controller a high-voltage generator 2 for an X-ray tube; an X-ray tube 3 generating X-ray; an X-ray filter 4; X-ray slits 5; an X-ray grid 6; an X-ray image intensifier 7; an optical lens and mirror unit 8 including lenses and a plane mirror; an iris 9; a television camera 10; an image acquisition and processing unit 11; an image display unit 12; a data storage unit 13; a position change mechanism 14-1 moving an X-ray detection unit 16 enclosed by a broken line; a position change controller 15; an X-ray shield 21; an electrocardiograph 31; an R-wave detector 32; etc. Numerals 18 and 19 are an input phosphor screen and an output phosphor screen, respectively, of the X-ray image intensifier 7.

An X-ray generator 36 is constructed by the the X-ray tube 3, the X-ray filter 4 and the X-ray slits 5, while the X-ray detection unit 16 is constructed by the X-ray image intensifier 7, the optical lens and mirror unit 8, an iris 9 and the television camera 10. On the other hand, an imaging unit is constructed by the X-ray generator 36, the X-ray grid 6, the X-ray shield 21 and the X-ray detection unit 16, while an image processing unit 37 is constructed by the image acquisition and processing unit 11, the image display unit 12 and the data storage unit 13.

The imaging position of a subject 17 is standing. An image pick-up tube 20 is used for an imaging element in the television camera 10, by means of which scanning of e.g. 1050 lines, 2100 lines and 4200 lines can be effected. Further, as explained later, devices of various types capable of measuring the phase of cardiac movement can be used in lieu of the electrocardiograph 31.

Figure 2:
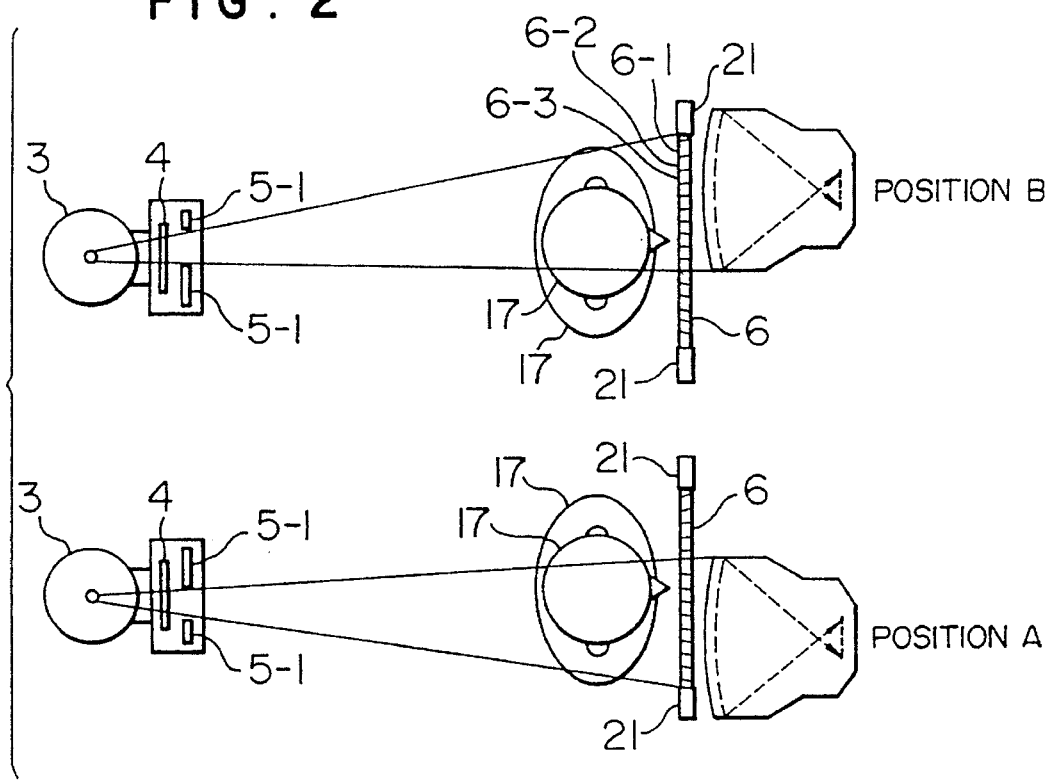
FIG. 2 shows schematical top views indicating the construction of an imaging unit according to the first embodiment.

FIG. 2 shows schematical top views indicating the construction of an imaging unit of the X-ray radiography system according to the present embodiment. This is a system for imaging a chest by two imagings and position A and position B indicate positions of the detection unit at imaging, which are a first imaging position and a second imaging position, respectively. The position A is a location where the detection unit covers a region including one single lung and a mediastinum, while the position B is a location where the detection unit covers a region including the other single lung and the mediastinum. Representative examples of the position A and the position B are a left and a right position, respectively, away from the body axis by 85 mm. A part 5-1 restricting X-ray beam in a horizontal direction among the X-ray slits 5 moves, depending on the positions A and B of the detection unit. The other slit restricting X-ray beam in a vertical direction is omitted in FIG. 2.

For detail of electrocardiographic measurement, refer to e.g. description in "Fundamentals of Medicine and Pharmacy I (Mikusu Co. Lt., published 1981)" p. 123.

An outline of the function of each of the parts described above is as follows.

The electrocardiograph 31 generates an electrocardiographic signal of the subject 17, while the R-wave detector 32 determines an electrocardiographic synchronizing signal, based on the electrocardiographic signal.

The imaging-sequence controller 1 defines an imaging sequence for imaging by X-ray at the two predetermined positions (position A and position B) by means of the X-ray detection unit 16 in accordance of the electrocardiographic synchronizing signal, i.e. pulse width and pulse interval of the two X-ray pulses, high-voltage (X-ray tube voltage), tube current, working mode of the television camera, movement sequence of the opening portion of the X-ray slit 5-1, and movement sequence of the X-ray detection unit 16. The position change controller 15 holds the X-ray detection unit 16 at each of the two predetermined positions in a still state at X-ray imaging and moves it during the interval between the two X-ray pulses described above while maintaining it parallelly to a grid plane of the X-ray grid by controlling the position change mechanism 14-1. In this way it is possible to carry out successively two X-ray imagings at the two positions stated above.

The high voltage generator 2 generates voltage and current according to the imaging-sequence so that the X-ray tube 3 generates X-ray. The X-ray filter 4 absorbs X-ray of low energy in order to decrease exposure dose and to decrease scattered X-ray so as to improve contrast on the image. X-ray transmitted by the subject 17 is attenuated by the fact that scattered X-ray is absorbed by X-ray absorbers 6-1, 6-2, 6-3, . . . which composes the X-ray grid 6 and thereafter it is projected to the X-ray image intensifier 7. The input view field of the X-ray image intensifier is one covering a region including a single lung and the mediastinum. An X-ray image projected to the input phosphor screen 18 of the X-ray image intensifier is transformed into a visible image on the output phosphor screen 19 owing to the function of the X-ray image intensifier 7. The optical lens and mirror 8 focuses this visible image on the television camera 10. The television camera 10 transforms the image into video signals, which are inputted to the image acquisition and processing unit 11.

The image acquisition and processing unit 11 A/D-transforms the inputted video signals; stores them in an internal frame memory; corrects geometrical image distortion and shading of image value of the two digital images thus obtained due to the X-ray detection unit; joins the two images so that parts of the subject contained in common in the two images are superposed on each other; displays an image thus joined on the image display unit 12 after having subjected it to image processing; and stores the image in the data storage 13. The image display unit 12 has a function of displaying an image of either one of single lungs and the joined image. It is possible also to observe a right and a left single lung image juxtaposed right and left. A method for superposing the images is described in the U.S. patent applications Ser. No. 08/186471 filed on Jan. 26, 1994 and Ser. No. 08/240313 filed May 10, 1994 and they are incorporated herein by reference.
(2nd EMBODIMENT)

Figure 3:
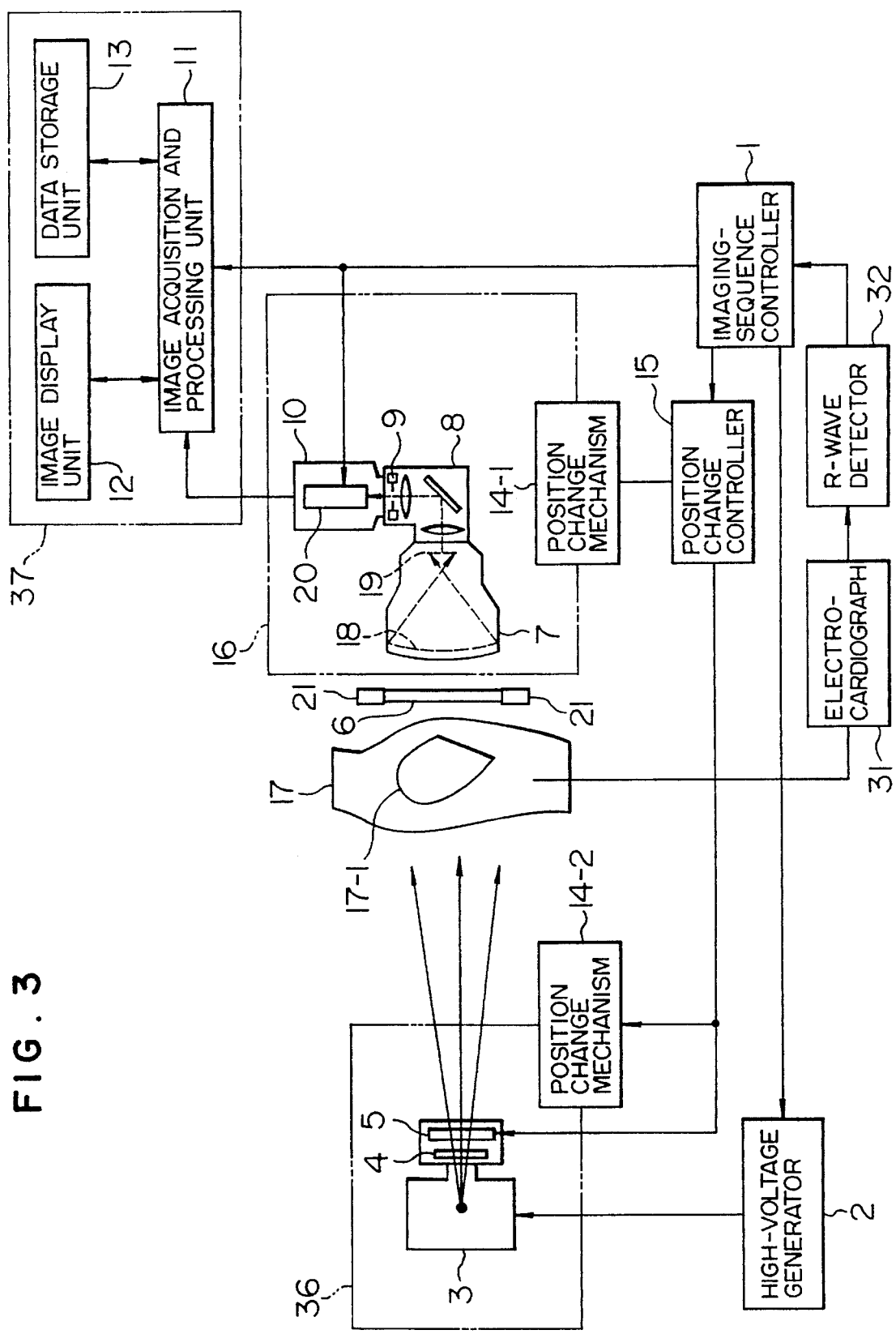
FIG. 3 is a schematical side view indicating the construction of a digital X-ray radiography system according to a second embodiment, to which the present invention is applied.

FIG. 3 is a schematical side view indicating the construction of another digital X-ray radiography system for chest, to which the present invention is applied. The X-ray radiography system according to the present embodiment comprises a position change mechanism 14-2 for moving the X-ray generator 36 in synchronism with the X-ray detection unit 16 in addition to the digital X-ray radiography system according to the first embodiment. The position change mechanism 14-2 is controlled by the position change controller 15 in synchronism with the position change mechanism 14-1. The different parts indicated in FIG. 3 except for the position change mechanism 14-2 have same functions as those indicated in FIG. 1. In the present embodiment the X-ray generator 36 and the X-ray detection unit 16 are moved in synchronism with each other differently from those in the first embodiment.

Figure 4:
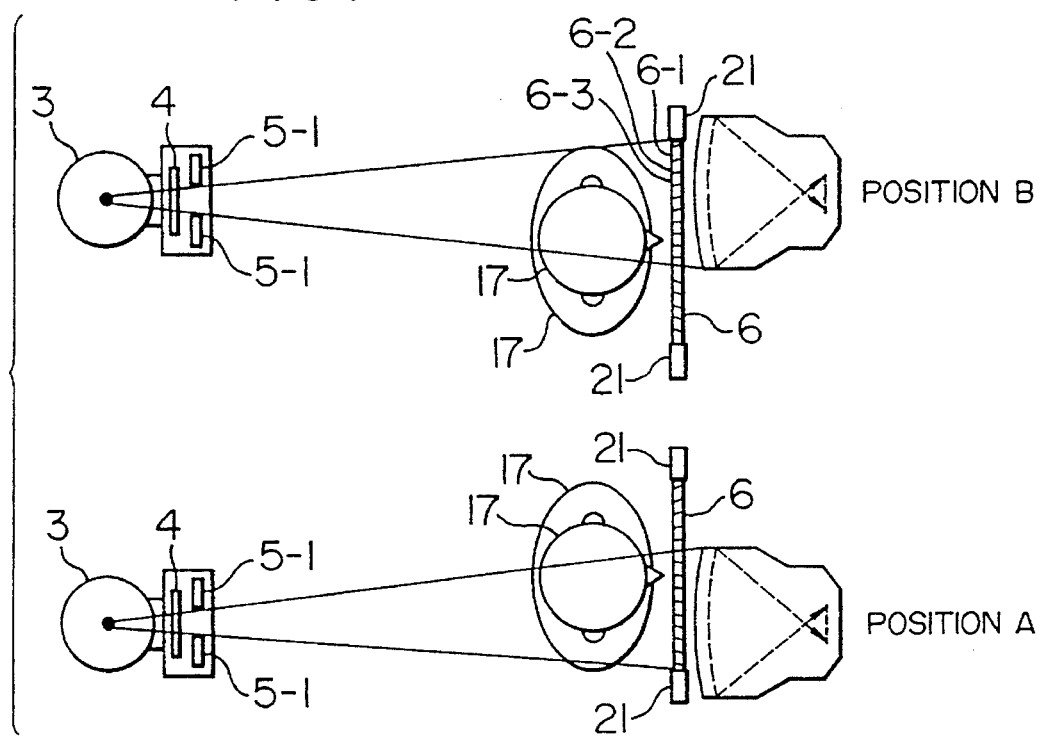
FIG. 4 shows schematical top views indicating the construction of an imaging unit according to the second embodiment.

FIG. 4 is a schematical top view indicating the construction of the imaging unit of the X-ray radiography system according to the second embodiment. The present apparatus is one for imaging a chest by a plurality of imagings. For example, the X-ray detection unit 16 at the first imaging position A covers a region including a single lung, the mediastinum and the heart and the X-ray detection unit 16 at the second imaging position B covers a region including the other single lung, the mediastinum and the heart, similarly to the first embodiment. Representative examples of the position A and the position B are a left and a right position away from the body axis by 85 mm, respectively.

Further a joined image may be obtained by effecting a plurality of imagings while moving the X-ray generator 36 and the X-ray detection unit 16 enclosed by broken lines in FIG. 3 on concentric arcs in synchronism with each other, putting the subject 17 therebetween and by joining a plurality of images thus obtained.

A plurality of images are obtained according to imaging-sequences explained in following embodiments by using the systems according to the first and second embodiments explained above and an image is synthesized by joining a plurality of images so that duplicated regions in two images are in accordance with each other after having subjected the images to processing for correcting image distortion explained in the following embodiments. The number of imagings is not restricted to two but the present invention is useful also in case where more than two images are joined to synthesize an image. Further it is also possible to obtain a tomographic image by using the system according to the second embodiment to obtain a plurality of images by imaging the subject several times in different directions and by reconstructing a three-dimentional image by joining them. The imaging-sequences and correction of distortion in the images thus obtained will be explained below in detail.
(3rd EMBODIMENT)

Figure 5:
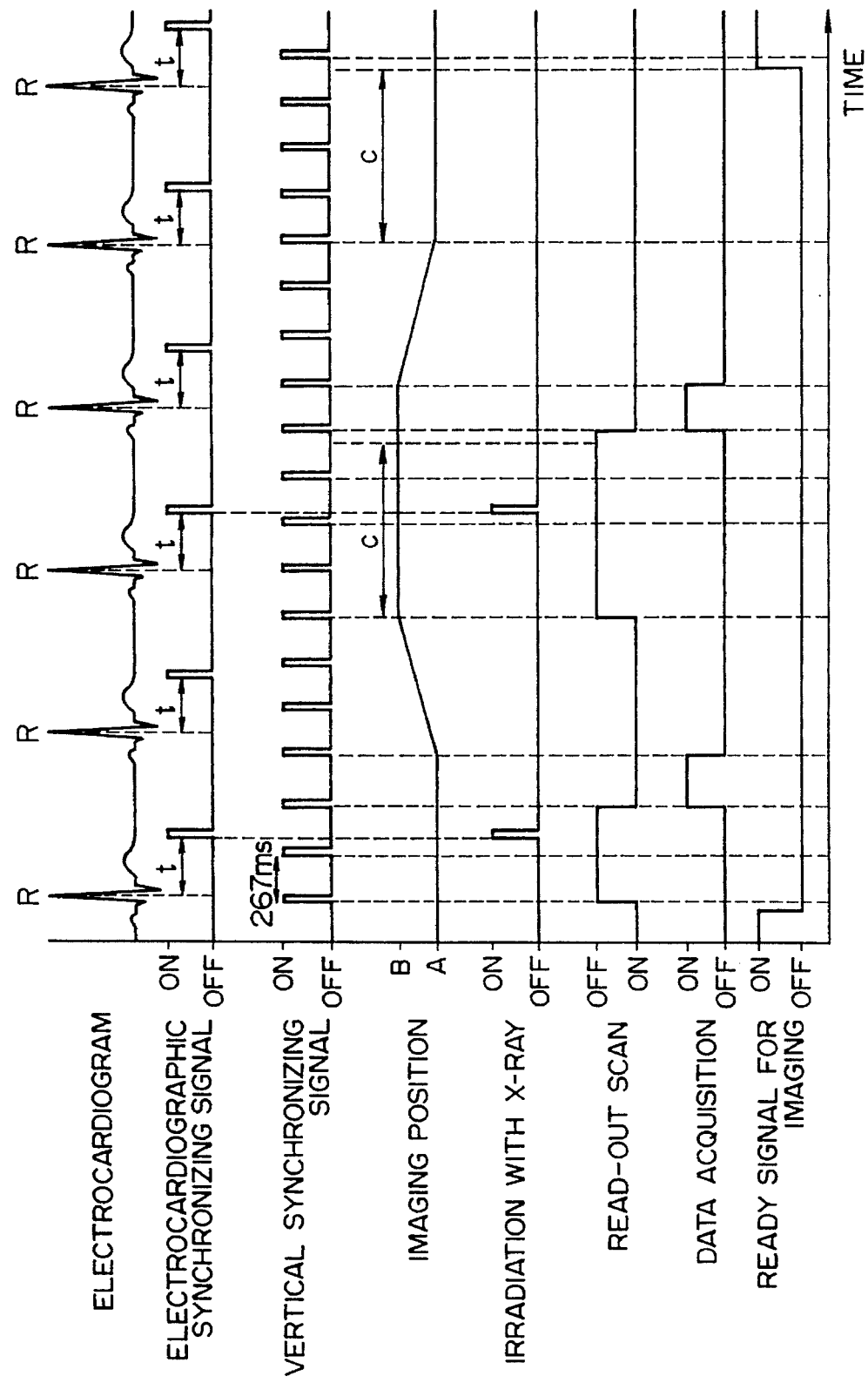
FIG. 5 shows a third embodiment of the present invention, which is an example of the time chart relating to systems according to the first and the second embodiment.

FIG. 5 shows an example of the time chart relating to the X-ray radiography systems according to the first and second embodiments. In the following description explanation will be made mainly for the system according to the first embodiment, in which the X-ray detection unit is moved. For the system according to the second embodiment procedure is identical to that of the first embodiment except that the X-ray generator and the X-ray detection unit are moved in synchronism with each other.

The time chart indicates a case where the television camera works at 3.75 frames per second and with a scanning mode of 2100 lines and therefore one frame time is 267 ms.

An electrocardiographic synchronizing signal is extracted by the R wave detector 32 from electrocardiographic waveform measured by the electrocardiograph 31.

As a method for extracting the electrocardiographic synchronizing signal from electrocardiographic waveform measured by the electrocardiograph 31, there is known a method, by which a spikelike R wave having a great amplitude indicating a point of time of contraction start of the heart is detected from the electrocardiographic waveform and a pulse, which is an electrocardiographic synchronizing signal, is generated at a point of time retarded from a timing pulse of the R wave by a predetermined period of time (t in FIG. 5), etc., as described JP-A-60-50900 stated previously. A prior art technique can be used for obtaining this timing pulse. FIG. 5 indicates a case where t is set at 300 ms as a representative value so that an electrocardiographic synchronizing signal corresponding to a telesystolic stage (an end of systolic stage), at which the cardiac movement is lowest and the volume of the heart is smallest, is emitted. t can be set at a suitable value by using results of observation of the number of pulses and the electrocardiographic waveform of the subject.

The X-ray detection unit is set previously at the position A and a ready signal for imaging is set at ON. When an imaging preparation is completed and an order of starting imaging is received, the ready signal for imaging is turned to OFF and read-out scan of the television camera is stopped at the directly succeeding frame. Thereafter, at a point of time where the electrocardiographic synchronizing signal is turned to ON at first, pulsed X-ray for the first imaging is emitted and an X-ray image is stored on an imaging screen.

Data of the first image are read during the frame directly succeeding the frame, where the subject is irradiated with X-ray, to be stored in the image acquisition and processing unit and data of the first image. The detection unit is moved to the position B during frames directly succeeding the frame, where reading out of the data has been terminated. FIG. 5 indicates a case where 3 frames are required for the movement. Reading scanning is again stopped during the frame directly succeeding the frame, where the movement has been terminated and thereafter, at a point of time where the electrocardiographic synchronizing signal is turned to ON at first, pulsed X-ray for the second imaging is emitted and an X-ray image is stored on an imaging screen.

Further, in case where pulsed X-ray irradiation for the second imaging described above is effected before a predetermined period of time necessary for attenuating microphonic noise of the image pick-up tube (section c indicated in FIG. 5, the figure indicating a case where it is 1000 ms long) has lapsed, a state where read-out scan is stopped is continued during frames ending after the point of time where the position change described above has been terminated. FIG. 5 shows such a state. Data of the second image are read during the frame directly succeeding them to be stored in the image acquisition and processing unit as data of the second image.

The detection unit is moved to the position A during frames directly succeeding the frame, where reading-out of the data has been terminated, and at a point of time where the period of time c necessary for attenuating microphonic noise of the image pick-up tube has lapsed, the ready signal for imaging is turned again to ON. The frame, during which the X-ray slit which restricts X-ray beam is moved, is same as the frame, during which the X-ray detection unit is moved. A representative example of the width of an X-ray pulse is 30 ms.

Figure 6A:
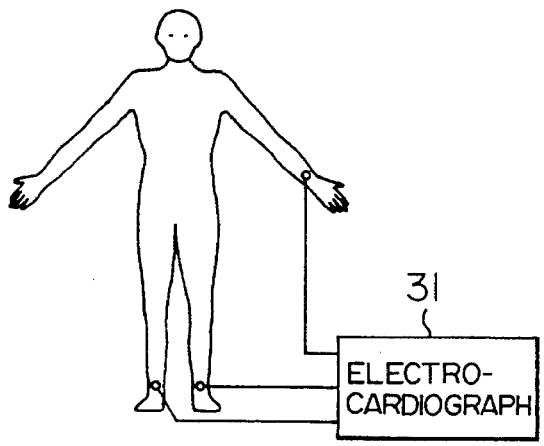
FIGS. 6A to 6F show examples of the system for measuring the phase of cardiac movement.

In the above explanation, as a method for measuring the phase of cardiac movement, the electrocardiographic signal of the subject 17 was obtained by means of the electrocardiograph 31; the R-wave was detected by means of the R-wave detector 32; and the electrocardiographic synchronizing signal was determined on the basis thereof. In this case, electrodes being mounted on the left wrist and the two ankles, as indicated in FIG. 6A, the electrocardiograph 31 measures electrical stimulation of the whole heart in potential difference between the electrodes. Various types of devices indicated in FIG. 6B to FIG. 6F can be used as a device for measuring the phase of cardiac movement in lieu of the electrocardiograph 31.

Figure 6B:
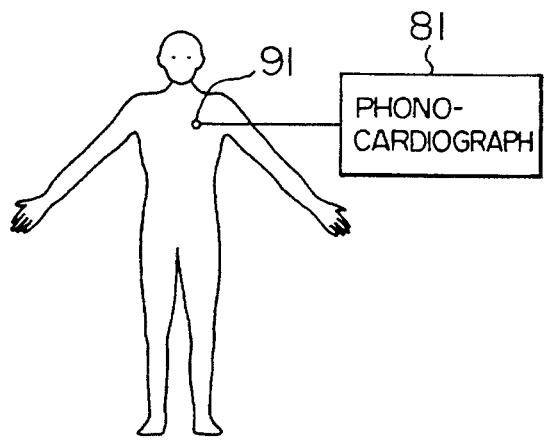
Figure 6C:
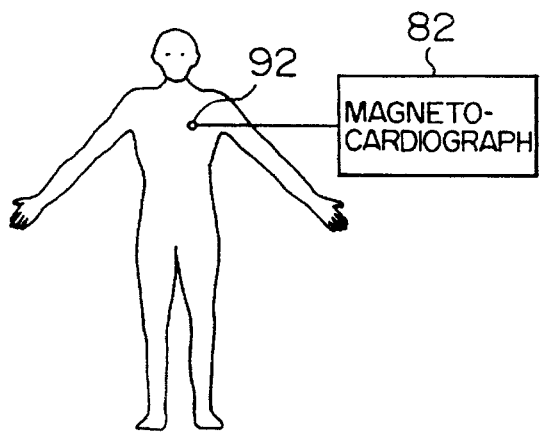
Figure 6D:
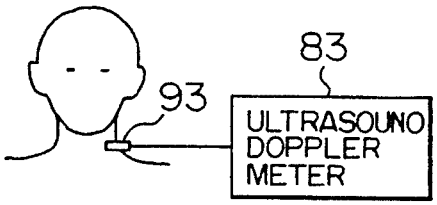
Figure 6E:
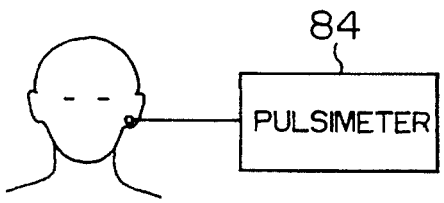
Figure 6F:
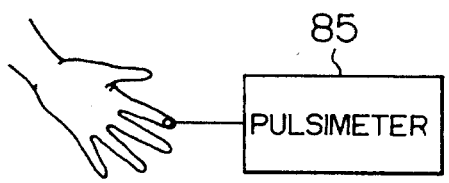

FIG. 6B shows a method, by which a phonocardiograph 81 is used. By this method, a microphone 91 is mounted on the front chest wall and cardiac sounds produced by opening and closing of the valves in the heart are amplified electrically to be measured. FIG. 6C shows a method, by which a magnetocardiograph 82 for measuring variations in magnetic field produced by cardiac electromotive force is used. By this method, an SQUID 92 is disposed in the neighborhood of the front chest wall and variations in magnetic field in the direction normal to the front chest wall are measured. FIG. 6D shows a method, by which an ultrasonic Doppler meter 83 for measuring velocity of blood flow flowing in blood vessel is used. By this method, an ultrasonic probe 93 is mounted e.g. at a part close to the carotid artery and effects transmission and reception of ultrasound to measure blood flow velocity by using the Doppler effect. FIGS. 6E and 6F show methods, by which pulsimeters 84 and 85 for measuring variations in pressure in the blood vessel due to pulsation is used, pressure sensors being mounted on an ear, a finger extremity, etc.

(4th EMBODIMENT)

Figure 7:
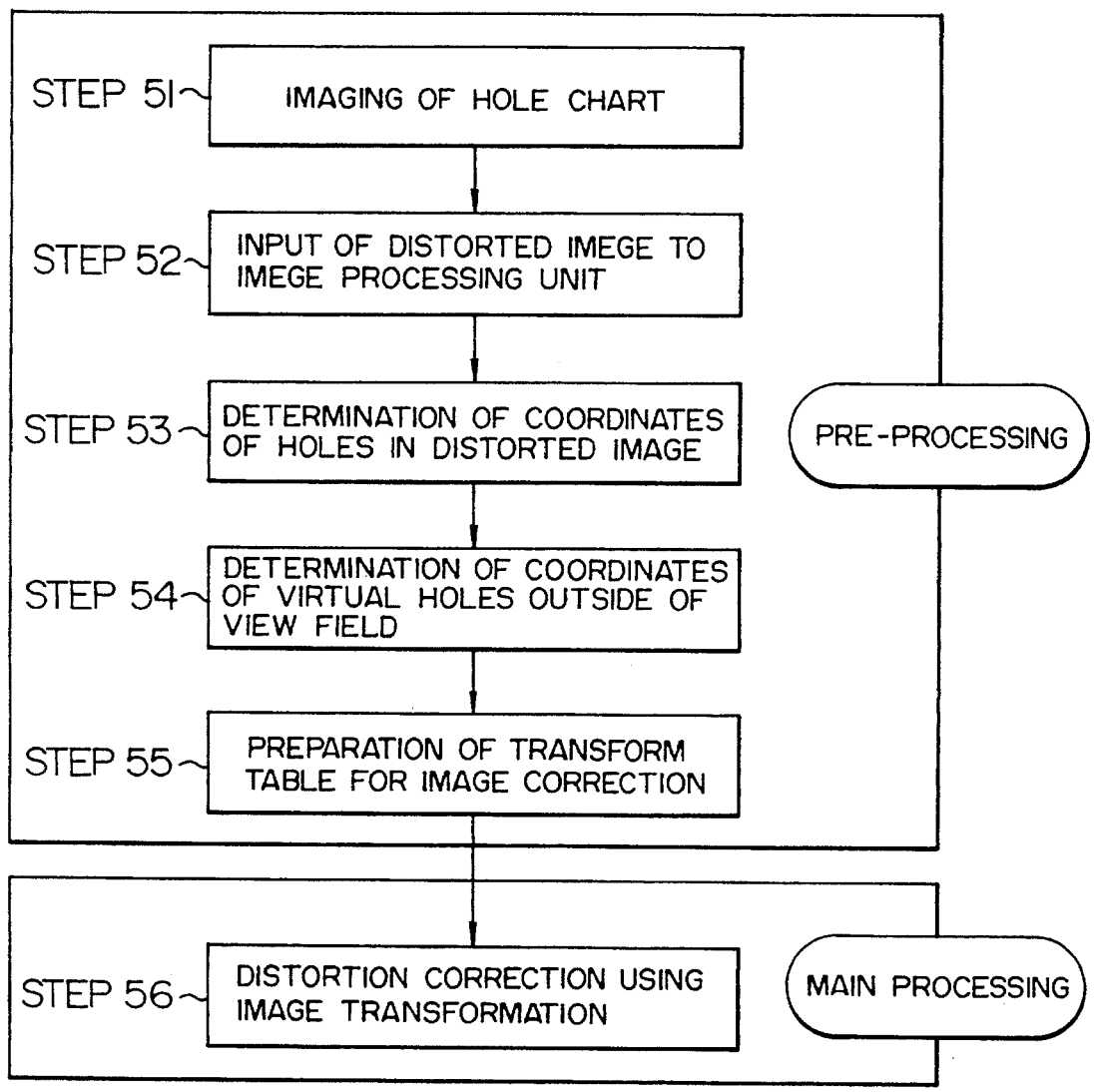
FIG. 7 is a flow chart indicating an outline of processing procedure of an image distortion correcting method, which is a fourth embodiment of the present invention.

Now an outline of processing procedure of the image distortion correcting method for each of a plurality of images relating to a real subject to be examined, imaged in the first to third embodiments, will be explained, referring to FIG. 7.

The image distortion correcting method according to the present embodiment can be divided into two parts, i.e. a preliminary processing, in which at first, a phantom which consists of plural objects whose position is already known (phantom or chart constructed so that position of each of a plurality of objects is known) is imaged; distortion amount is measured for each position on the plurality of objects, starting from images thus obtained; and a transform table for distortion correction is prepared, and a main processing, in which subsequently images obtained by imaging the real subject to be examined as explained in the first to third embodiments are corrected by table look up.

Figure 8:
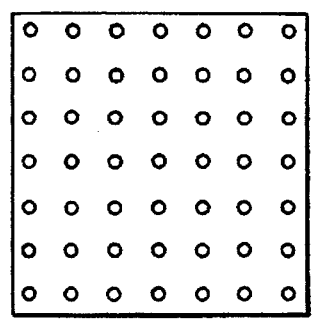
FIG. 8 shows an example of a hole chart according the fourth embodiment.

In the pre-processing, at first, the phantom is imaged to obtain a phantom image (hereinbelow called distorted image for the sake of simplification) (Step 51). For the phantom described above, e.g. a chart plate, for which a square lattice is drawn on a plate made of a material absorbing X-ray and holes through which X-ray passes are formed only at lattice points, as indicated in FIG. 8, is used. Concretely speaking, an arrangement of holes obtained by forming holes having a diameter of 1 mm only at lattice points of a square lattice consisting of squares, whose side is 2 cm long, drawn on a brass plate 1 mm thick, (hereinbelow called hole chart) is used therefor. It is a matter of course that the positions where the holes are formed (lattice points) are known.

At imaging the hole chart the position thereof is adjusted so that the holes at the lattice points are arranged in the directions parallel and perpendicular to the scanning lines of the television camera. By this adjustment it is possible to identify easily to which coordinates on a distortion free image coordinates of the objects and virtual objects correspond.

Figure 9:
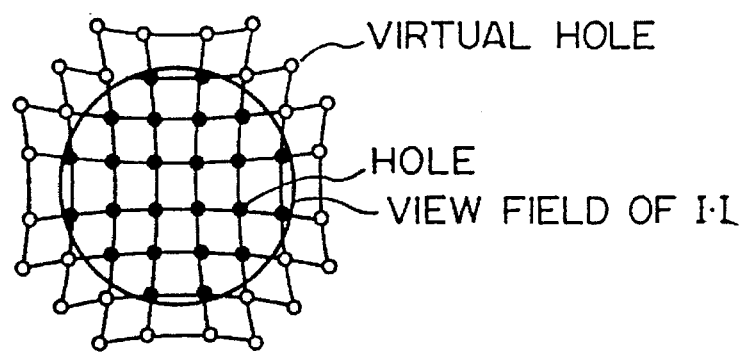
FIG. 9 is a diagram indicating schematically an example of a distorted image obtained by imaging the hole chart according to the fourth embodiment.

An example of the phantom image (distorted image) obtained by imaging the hole chart is indicated schematically in FIG. 9. The holes indicated by black circles within the view field of the image intensifier (I.I) are obtained really in the form of an image. White circles outside of the view field of the I.I show positions of virtual holes assumed to be measured virtually, which are obtained by extrapolation using the coordinates of the black circles within the view field of the I.I. A concrete method for obtaining positions of the virtual holes will be explained later. In FIG. 9, lines connecting white and black circles are inscribed in order to facilitate to see the state of distortion in the image and an image is composed of arrangements of different circles described above. This distorted image is inputted to the image processing unit (Step 52) to be processed by the procedure indicated in FIG. 7.

In the following explanation, for the sake of simplification, an amount of distortion of holes or expression of the amount of distortion means a difference between the position of each of the holes in an image obtained by an ideal measuring unit producing no image distortion (that is distortion free image is obtained) and the position of each of the holes in an image obtained by a real measuring unit producing image distortion.

Then coordinates of the center position of each of the holes in the distorted image are determined to know precisely the amount of distortion (Step 53). Then coordinates of the center position of each of the virtual holes outside of the view field are determined in order to know precisely the amount of distortion of each of the holes outside of the outermost holes (Step 54). FIG. 9 shows a relation among the boundary of the view field of the image intensifier, the holes (measured points) and the virtual holes. The coordinates of the center position of each of the virtual holes are obtained by extrapolation using values of the coordinates of the center positions. Next a transform table for distortion correction is prepared (Step 55).

Now determination of the coordinates of the center position of each of the holes in the distorted image, determination of the coordinates of the center position of each of the virtual holes in the distorted image, and generation of the transform table for distortion correction will be explained below in detail.

Figure 10:
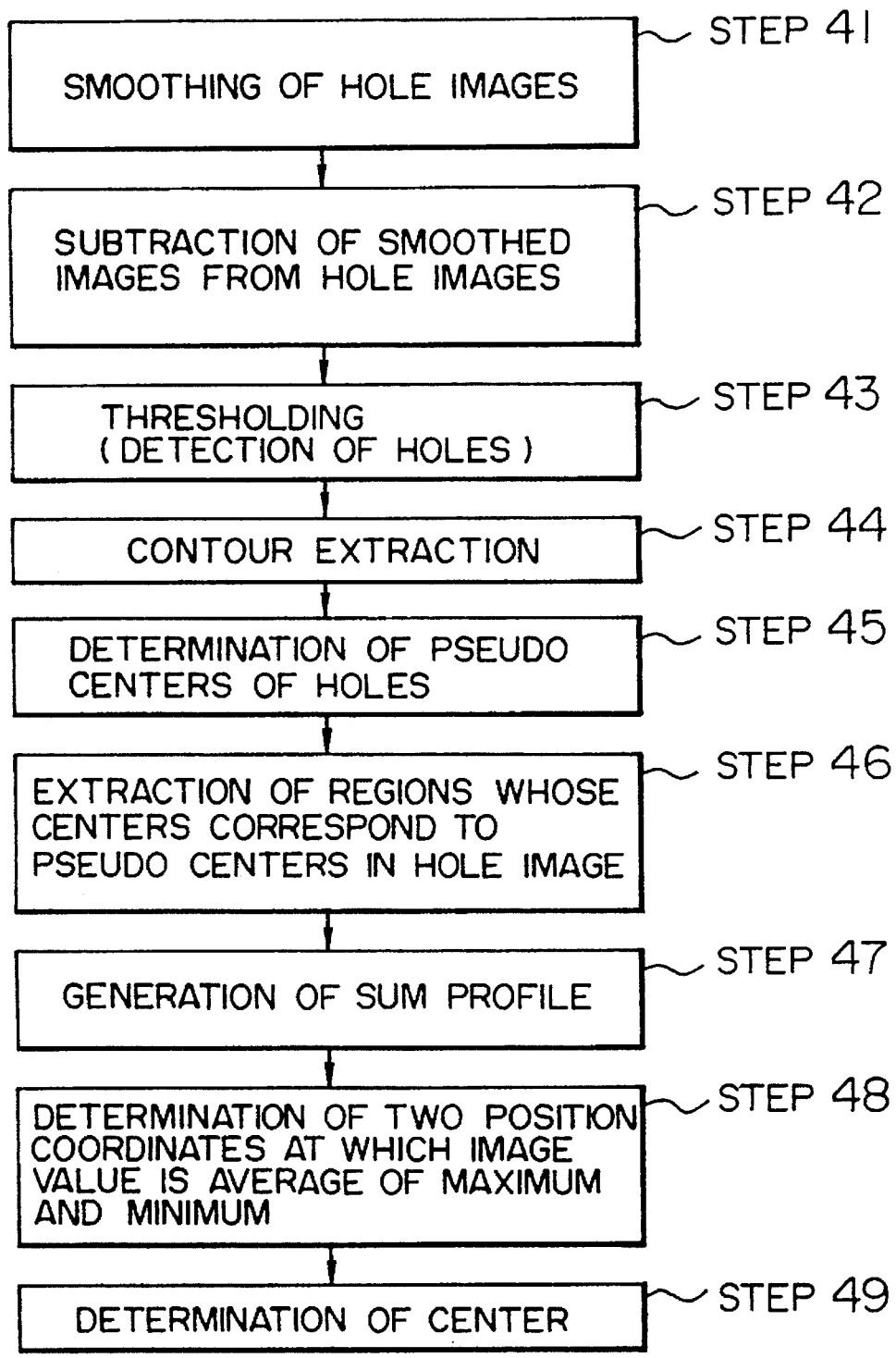
FIG. 10 is a flow chart indicating an outline of processing procedure for extracting a center position of a hole according to the fourth embodiment.
Figure 11:
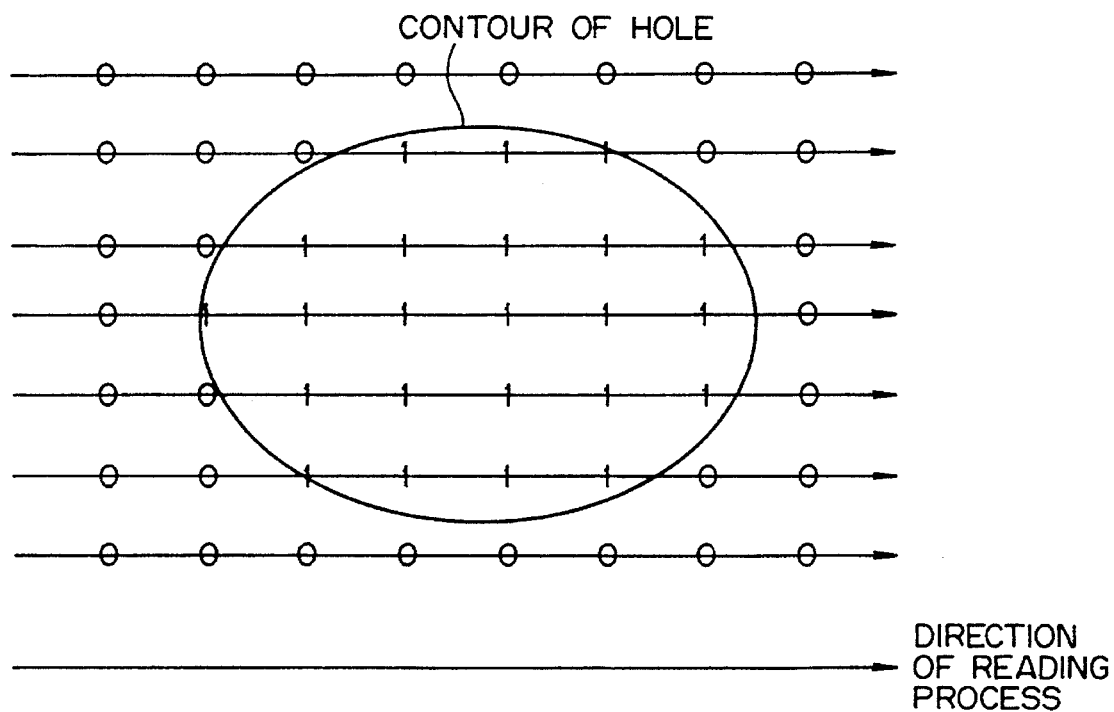
FIG. 11 shows an example of an image of binary representation for the hole image according to the fourth embodiment.
Figure 12:
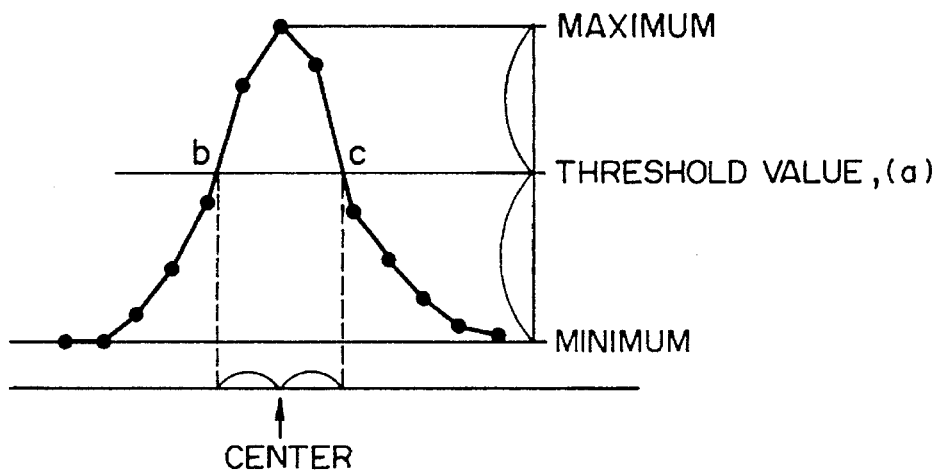
FIG. 12 is a profile of the hole image according to the fourth embodiment.

Since each of the holes is imaged with a certain magnitude in the image, it is necessary to extract the center position of each of the holes. Procedure of the processing for extracting the center position of each of the holes is indicated in FIG. 10. At first, in order to eliminate influences of shading (non-uniformity of sensitivity) of the detecting unit, a smoothed image of the hole image obtained by imaging the hole chart is obtained (Step 41). Then an image of difference between the hole image and the smoothed image is obtained (Step 42). Each of the pixels in the image of difference is expressed in binary representation by either one of 0 and 1 to obtain a binary image (FIG. 11) (Step 43) to separate hole parts from a background part and to extract contours of the holes (Step 44). For the contour of each of the holes separated in the binary image, the maximum and the minimum of positions representing the relevant hole on a coordinate axis in the direction of the reading process are obtained, a pseudo center of each of the holes being determined from the average thereof (Step 45). Regions, whose centers are pseudo centers thus obtained in the hole image (measured image) prior to formation of the binary image indicated in FIG. 11, are extracted (Step 46). Process for reading successively values in unit of a pixel in the horizontal (or vertical) direction is repeated in the vertical (or horizontal) direction. Read out values (hole part) are added in the vertical (or horizontal) direction to obtain a profile as indicated in FIG. 12 (Step 47). FIG. 12, the abscissa represents positional coordinates in the horizontal (or vertical) direction, while the ordinate represents results of addition in the vertical (or horizontal) direction. A representative example of the number of additions is 20. If the number of additions of positions distant from the relevant hole is too great, the peak of the profile corresponding to the hole part is buried in background so that it becomes inconspicuous. Therefore the addition is effected within the hole part indicated in FIG. 11 as far as possible. In the obtained profile, intersections b and c of the average value a (threshold value) of the maximum and the minimum with the profile described above are calculated by interpolation (Step 48), the average (middle point) thereof is the center of the relevant hole (Step 49).

Now a method for obtaining a correspondence relation between a pincushion distorted image and a not distorted image in the present embodiment will be explained below.

A theoretical formula of the pin-cushion type distortion in real time digital radiography (DR) is given by;

$$x' = x + D \cdot x \cdot (x^2 + y^2) \\ y' = y + D \cdot y \cdot (x^2 + y^2) \quad (1)$$

where (x, y) represents original positional coordinates, when a point where there is no distortion is used as an origin, while (x', Y') positional coordinates, when distortion is added thereto, represents the x-axis direction being a direction parallel to the scanning lines of the television camera, the y-axis direction being a direction perpendicular to the scanning lines of the television camera; D being a constant representing the amount of distortion. It is considered to fit the coordinates on the distorted image to the coordinates on the not distorted image, using Eq.(1), when the coordinates of virtual holes set outside of the view field of the detector (white circles in FIG. 4) are determined by using the coordinates of holes, whose position is known, (black circles in FIG. 4) in the hole chart.

When center positions of holes arranged on a straight line y=a·x+b are used as hole positions, Eq.(1) can be rewritten as follows;

$$x' = x + D \cdot x \cdot \{x^2 + (a \cdot x + b)^2\} \\ y' = (a \cdot x + b) + D \cdot (a \cdot x + b) \cdot \{x^2 + (a \cdot x + b)^2\} \quad (2)$$

thus fitting in a cubic equation with respect to x is possible for x' and y'. On the other hand, when center positions of holes arranged on a straight line x=(y−b)/a are used as hole positions, Eq.(1) can be rewritten as follows;

$$x' = (y-b)/a + D \cdot (y-b)/a \cdot [\{(y-b)/a\}^2 + y^2] \\ y' = y + D \cdot y \cdot [\{(y-b)/a\}^2 + y^2] \quad (3)$$

thus fitting in a cubic equation with respect to y is possible for x' and y'. When the coordinates on the distorted image are fitted to the coordinates on the not distorted image according to Eq.(2) or Eq.(3), using holes arranged on a straight line, when the coordinates of virtual holes set outside of the view field of the detector are determined by using the coordinates of center positions of holes, whose position is known, values thereof on the x and the y axis can be calculated separately and thus it is possible to obtain the coordinates of virtual holes on this straight line only by fitting.

Further by setting the straight line, on which object bodies (holes) are arranged, perpendicularly to the scanning direction of the television camera, (a, y) being coordinates of holes on a not distorted image, Eq. (1) can be rewritten as follows;

$$x' = a + D \cdot a \cdot (a^2 + y^2) \\ y' = y + D \cdot y \cdot (a^2 + y^2) \quad (4)$$

and thus x' and y' can be fitted by using a quadratic equation and a cubic equation of y, respectively.

Similarly, by setting the straight line parallelly to the scanning direction of the television camera (i.e. y being constant), coordinates of holes on the not distorted image being represented by (x, b), Eq.(1) can be rewritten as follows;

$$x' = x + D \cdot x \cdot (x^2 + b^2) \\ y' = b + D \cdot b \cdot (x^2 + b^2) \quad (5)$$

and thus x' and y' can be fitted by using a cubic equation and a quadratic equation of x, respectively.

Furthermore, in a polar coordinate system, Eq.(1) is expressed by;

$$i \ r' = r \cdot (1 + d \cdot r^2) \quad (6)$$

where r represents the distance from the origin of the coordinate system, while r' is the distance after distortion has been added thereto. Consequently, by arranging holes, whose position is known, radially from a center region, where there is no distortion and by determining coordinates of virtual holes set outside of the view field by using the coordinates of the holes, Eq.(6) can be used for the equation for fitting instead of Eq.(1). As the result, it is not necessary to obtain x coordinates and y coordinates of virtual holes separately and the number of necessary fitting processes is decreased.

In the present embodiment the coordinates of virtual holes outside of the view field (refer to FIG. 9) are obtained by extrapolation from the coordinates of holes (black points) within the view field. Values on the x axis (x') on the distorted image of a series of holes along a vertical line of the lattice (i.e. series of holes having constant x) are fitted by using a biquadratic equation of y and y coordinates (y') are fitted by using a cubic equation of y, while values on the x axis (x') on the distorted image of a series of holes along a horizontal line of the lattice (i.e. series of holes having constant y) are fitted by using a cubic equation of x and values on the y axis (y') are fitted by using a biquadratic equation of x. x' of a series of holes having constant x and y' of a series of holes having constant y can be fitted theoretically by using a quadratic equation, as clearly seen from Eqs.(4) and (5), but in reality, since complicated distortion is added thereto, fitting is effected by using a biquadratic equation.

Further, in case where the coordinates of virtual holes can be obtained both from a series of holes in the horizontal direction and from a series of holes in the vertical direction, an average of two values thus obtained is used. Furthermore coordinates can be determined by using coordinates obtained from one-dimensional series of holes in various directions such as inclined directions, etc. By using coordinates in several directions as described above, an effect can be obtained to decrease errors in fitting.

The transformation table is of position correspondence type, in which points (x', y') on a distorted image are stored with respect to point (x, y) on a distortion corrected image and it is prepared for x' and y'. x' and y' are real numbers in order to effect transformation with a high precision. It is possible to improve further the precision of the image transformation by using real numbers therefor.

Figure 13:
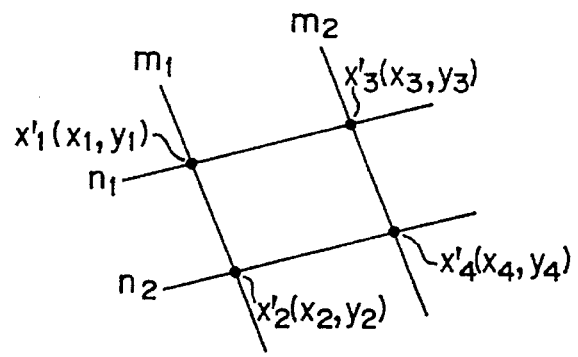
FIGS. 13 and 14 are diagrams for explaining a transform table for distortion correction according to the fourth embodiment.

Now an efficient method for preparing the transform table for distortion correction will be explained, using FIG. 13.

An x-axis and a y-axis, on which the unit of length is a constant pixel interval, are adopted in the horizontal direction and the vertical direction, respectively, in the transform table The coordinates (x', y') on the distorted image of each of holes and virtual holes are stored in the coordinates ($x_i$, $y_i$) ( i=1, . . . , 4) on the not distorted image of holes and virtual holes. FIG. 13 shows an aspect of a table for x'. In case where $x_i$ and $y_i$ are not integer, it is necessary that the unit is smaller that a pixel interval and that, as the result, the matrix size should be increased, in order to keep the precision of the transform table. In order not to increase the matrix size, it is necessary to obtain values in the transform table, in which coordinates are integers in the proximity of x and y, by extrapolation calculation. Consequently, by the fact that the coordinates of holes, whose position is known, are made be in accordance with the coordinates of either one of pixel centers, i.e. x and y are integers, it is possible that the matrix size is made equivalent to the number of pixels of an inputted image and that x' and y' are stored in the transform table directly without interpolation calculation.

Figure 14:
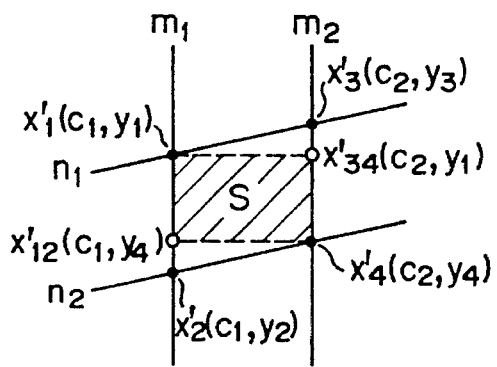

Further FIG. 14 shows a transform table in case where straight lines $m_1$ and $m_2$, on which object bodies are arranged, are perpendicular to the scanning direction of the television camera.

Since the values on the x axis of the holes and the virtual holes in a not distorted image are constants ($c_1$ and $c_2$), a point $x'_{12}$ on a straight line $m_1$ having a same value on the y axis as $x'_4$ and a point $X'_{34}$ on a straight line $m_2$ having a same value on the y axis as $x'_1$ can be easily obtained by interpolation from $x'_1$ and $x'_2$ and from $x'_3$ and $x'_4$, respectively. In case where a transform table is prepared within a rectangle S, since it is effected by two-dimensional linear interpolation (four point Lagrange interpolation) by using $x'_1$, $X'_{12}$, $X'_3$ and $X'_{34}$, which are apices of the rectangle, interpolation of $x'_{12}$ and $X'_{34}$ is easier and thus preparation of the table becomes also easier.

Similarly, in case where straight lines $n_1$ and $n_2$, on which the holes described above are arranged, are parallel to the scanning direction of the television camera, since the values on the y axis of the holes and the virtual holes on a not distorted image are constants, coordinates of the apices of the rectangle can be obtained easily by interpolation.

Further, in case where the straight lines $m_1$ and $m_2$, on which the holes described above are arranged, are perpendicular and the straight lines $n_1$ and $n_2$ are parallel to the scanning direction of the television camera, since both the values on the x axis and the values on the y axis of the holes and the virtual holes on the not distorted image are constants, they can be used as coordinates of the rectangle as they are.

Figure 15:
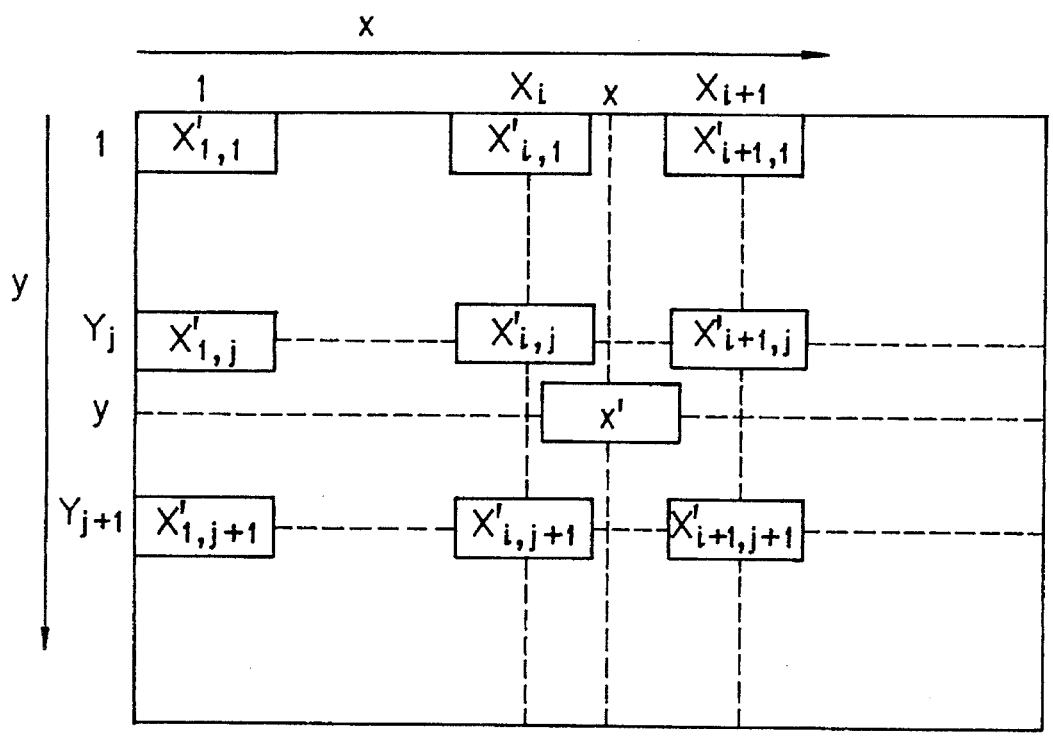
FIG. 15 is a table for x' for distortion correction according to the fourth embodiment.

Next procedure for preparing a table for x' is indicated. An x-axis and a y-axis, on which the unit of length is a one-pixel interval, are adopted in the horizontal direction and the vertical direction, respectively, in the transform table. Values on the x axis $X'_{i,j}$ of holes and virtual holes in a distorted image corresponding to relevant lattice points are stored in coordinates ($X_i$, $Y_j$) of holes and virtual holes (i: lattice point number in the horizontal direction, j: lattice point number in the vertical direction). The value $X'_{i,j}$ is obtained e.g. by the method described above. By this procedure a correspondence table as indicated in FIG. 15 is prepared. Values in the table other than the coordinates of the lattice points ($X_i$, $Y_j$) are obtained by interpolation using values stored in the coordinates of the lattice points ($X_i$, $Y_j$). The method for interpolation is e.g. linear interpolation by the four point Lagrange method and the value is obtained by using values at four points surrounding it in the neighborhood thereof. For example, a calculation formula for (x, y) satisfying $X_i < x < X_{i+1}$ and $Y_j < y \ Y_{j+1}$ is as follows;

$$\begin{aligned}x'(x,y) &= x'(X_i,Y_j) \cdot (1-s) \cdot (1-t) + \\ &\quad x'(X_{i+1},Y_j) \cdot s \cdot (1-t) + \\ &\quad x'(X_i,Y_{j+1}) \cdot (1-s) \cdot t + \\ &\quad x'(X_{i+1},Y_{j+1}) \cdot s \cdot t \\ &= X_{i,j}' \cdot (1-s) \cdot (1-t) + \\ &\quad X_{i+1,j}' \cdot s \cdot (1-t) + \\ &\quad X_{i,j+1}' \cdot (1-s) \cdot t + \\ &\quad X_{i+1,j+1}' \cdot s \cdot t\end{aligned} \quad (7)$$

where $X'_{i,j}=x'(X_i, Y_j)$, $X'_{i+1,j}=x'(X_{i+1}, Y_j)$, $X'_{i,j+1}=x'(X_i, Y_{j+1})$, and $X'_{i+1,j+1}=x'(X_{i+1}, Y_{j+1})$, and s and t represent values of $(x-X_i)$ and $(y-Y_j)$, respectively, when the distance between Xi and Xi+1 and the distance between $Y_j$ and $Y_{j+1}$ are normalized to 1. Preparation of the table for Y' is effected in a same manner as the preparation of the table for x'.

Now the main processing, by which an image obtained by imaging a real subject to be examined as explained in the first to the third embodiment, is corrected by table look up, will be explained. By the main processing, by image transformation using the table (table look up method), distortion correction is effected for each of the plurality of images obtained by imaging relating to the real subject to be examined. Values at the position coordinates (x', y') of pixels in a distorted image are adopted for values at the position coordinates (x, y) of respective pixels in an image to be corrected. In reality, since x' and y' are real numbers but not integer, corresponding data don't exist on the distorted image. Consequently necessary data are obtained by interpolation by the four point Lagrange method using values of 4 pixels surrounding it. Various sorts of methods such as nearest neighbor interpolation method, sampling function interpolation method, spline interpolation method, etc. may be used for the interpolation apart from the four point Lagrange method.

An approximation formula for fitting in the present embodiment is an equation having various degrees such as linear, quadratic, cubic, biquadratic, etc., depending on the form of distortion (which depends on influences of structure of the imaging unit and other various factors).

Further, also for distortion pattern, the present invention is useful for distortion correction in images having not only pin-cushion type distortion explained in the above embodiments but also various sorts of distortions, for which generated distortion pattern can be predicted.

Figure 16:
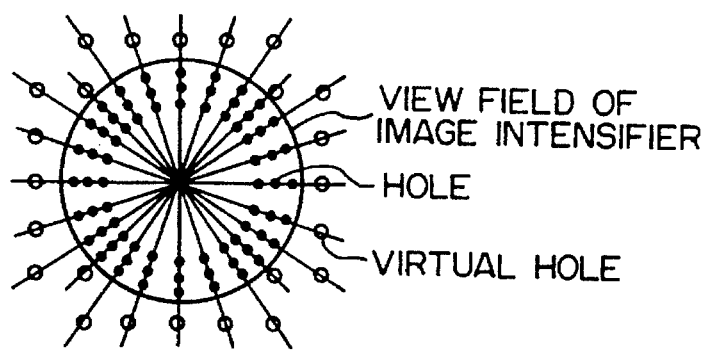
FIG. 16 shows another example of the hole chart according to the fourth embodiment.

Although, in the above explanation, examples using a lattice hole chart having holes arranged at intersections in a square lattice were explained, it may be possible also to determine positions of virtual holes by using a metallic radial hole chart (position of each of holes being known), in which holes are arranged on coaxial circles radially from a central region, where distortion is small, as indicated in FIG. 16. Further a combined hole chart obtained by combining a lattice hole chart described previously with the radial hole chart so that the center of the coaxial circles is in accordance with the center of the square lattice (position of each of holes being known) may be used. When the combined hole chart is used, in a first imaging the combined hole chart is imaged as it is, while in a second imaging the combined hole chart is imaged, preventing X-ray transmission by obturating either the holes at intersections in the square lattice or the holes arranged on the coaxial circles described above between the two sorts of holes with a material interrupting (attenuating) X-ray. By this imaging method, it is possible to facilitate classification of the two sorts of holes and as the result to simplify the whole correction processing procedure.

Further, although, in the present embodiment, centers of holes transmitting X-ray formed in a plate interrupting (attenuating) X-ray were used as a phantom which consists of plural objects whose position is already known, on the contrary it is possible also to obtain an image having a high contrast of the objects having known positions with respect to background by using centers of objects interrupting (attenuating) X-ray (e.g. pillar-shaped metal pieces, metal spheres) arranged on a plate transmitting x-ray.

In the different embodiments described above, an X-ray television camera consisting of an X-ray image intensifier, a television camera and an optical system combining them is used. In this way X-ray fluoroscopy is possible and positioning for imaging can be effected easily. Further, since image reading can be carried out in real time, a succeeding imaging can be effected in a short time, after the X-ray detection unit has been moved to an imaging position, and continuous imaging is also possible. Furthermore the method, by which an image pick-up tube is used as an imaging element, is one for which technical development is most advanced as a real time X-ray imaging system and utilization of a superfine camera having more than 2000 scanning lines is possible, and it is characterized in that a high-resolution X-ray image can be obtained relatively easily.

In addition, in the different embodiments described above, a CCD element may be used for the imaging element in the television camera. With the image pick-up tube used in the above different embodiments, when the detection unit is moved, microphonic noise can be mixed in the read-out image by influences of vibration of constituent parts within the image pick-up tube due to mechanical vibration. On the contrary, when a CCD element is used instead thereof, since the CCD element is a solid element and therefore no noise due to vibration is produced, it is possible to effect reading-out of the image and the movement of the detection unit at the same time and as the result to shorten interval between two successive imagings.

The present invention is not limited to the embodiments described above, but it can be realized, modified and indicated in examples described below. For example, the digital X-ray radiography system according to the present invention can be applied also to tomography, enlarged radiography, stereo radiography, etc., which can be carried out by using a prior art X-ray radiography system. As the result, images made by tomography, enlarged radiography, stereo radiography, etc. can be exteAded to a larger view field and a remarkably finer image than those obtained by prior art techniques and further application fields of the prior art techniques can be enlarged.

Furthermore the number of imagings in the divided imaging according to the present invention is not limited to two, but the present invention is useful more generally for a plurality of imagings. In addition, the field of utilization of the present invention is not only the digital X-ray radiography but also optical imagings such as imaging techniques, by which parts of a subject to be examined are moved by pulse of the heart, which gives rise to influences on an image, e.g. thermography.

We claim:

1. An X-ray radiography method comprising:
   (a) irradiating a chart with X-rays from an X-ray source, said chart having elements arranged on a straight line with predetermined position relations in each of a plurality of directions;
   (b) detecting X-rays transmitted through said chart by an X-ray detection unit having an X-ray image intensifier and a television camera and providing detected signals thereof, said chart being arranged such that said straight line is parallel or perpendicular to the scanning lines of said television camera;
   (c) obtaining an image of said chart by digitizing the detected signals,
   (d) calculating a center position of each of said elements in said image of said chart, from a center of each of a profile of said elements in said image of said chart in the horizontal or vertical direction;
   (e) calculating a center position of each of said elements which can not be imaged by said X-ray image intensifier, by extrapolation from the center position of said elements within the imaging view field;
   (f) determining correspondence between said center position of each of said elements obtained in steps (d) and (e) and a pixel position in an image of said chart obtained by an ideal imaging in which a distortion free image of said chart can be obtained;
   (g) calculating each of pixel positions in said distortion free image by a two-dimensional linear interpolation using said center positions of each of said elements, obtained in steps (d) and (e);
   (h) preparing a transform table making each of the pixel positions in said image of said chart correspond to each of the pixel positions in said distortion free image;
   (i) obtaining a plurality of digital images of a subject to be examined in a predetermined phase stage of an electrocardiographic signal;
   (j) correcting, according to the transform table, image distortion in said digital images of said subject by transforming each of said plurality of digital images of said subject to be examined;
   (k) joining a plurality of digital images thus corrected to each other; and
   (1) displaying a digital image obtained in step (k);
   wherein, in the transform table, said each of the center position of said elements within the imaging view field is made to correspond to one of the pixels in said distortion free image,
   wherein said plurality of images are obtained, putting each of a single lung and the mediastinum of said subject to be examined in said imaging view field of said X-ray detection unit, and
   wherein a synthesized image is obtained by joining said plurality of images, for which image distortion is corrected, so that portions included in common in corrected images are in accordance with each other.

2. An X-ray radiography method according to claim 1, wherein said predetermined phase stage of an electro-cardiographic signal is at an end of a systolic stage.

3. An X-ray radiography method according to claim 1, wherein the center positions of said elements of said chart are arranged on a plurality of straight lines disposed radially passing through a point.

4. An X-ray radiography method according to claim 1, wherein said chart is a plate having a plurality of holes, through which X-rays pass, and said chart is made of a material attenuating X-rays.

5. An X-ray radiography method according to claim 1, wherein said chart is a plate for transmitting X-rays, on which elements made of a material attenuating X-rays are disposed, and the cross-section of each of said elements is axially symmetric.

6. An X-ray radiography method according to claim 1, wherein said plurality of digital images of said subject to be examined are images obtained at different positions by moving a position of the X-ray detection unit with respect to the X-ray source.

7. An X-ray radiography method according to claim 1, wherein said plurality of digital images of said subject to be examined are images obtained at different positions by moving the X-ray source and the X-ray detection unit in synchronism with each other.

8. An X-ray radiography method according to claim 1, wherein said plurality of digital images of said subject to be examined are images obtained at different positions while moving the X-ray source and the X-ray detection unit on a circle surrounding said subject to be examined in synchronism with each other and a tomographic image is obtained by three-dimensional reconstruction by joining said plurality of images, for which image distortion is corrected.

9. An X-ray radiography method comprising:
   (a) irradiating a chart with X-rays from an X-ray source, said chart having elements arranged on a straight line with predetermined position relations in each of a plurality of directions;
   (b) detecting X-rays transmitted through said chart by an X-ray detection unit having an X-ray image intensifier and a television camera and providing detected signals thereof, wherein said chart being arranged such that said straight line is parallel or perpendicular to the scanning lines of said television camera;
   (c) obtaining an image of said chart by digitizing the detected signals;
   (d) calculating a center position of each of said elements in said image of said chart, from a center of each of a profile of said elements in said image of said chart in the horizontal or vertical direction;
   (e) calculating a center position of each of said elements which can not be imaged by said X-ray image intensifier, by extrapolation from the center position of said elements within the imaging view field;
   (f) determining correspondence between said center position of each of said elements obtained in steps (d) and (e) and a pixel position in an image of said chart obtained by an ideal imaging in which a distortion free image of the image of said chart can be obtained;
   (g) calculating each of pixel positions in said distortion free image by a two-dimensional linear interpolation using said center positions of each of said elements, obtained in steps (d) and (e);
   (h) preparing a transform table making each of the pixel positions in said image of said chart correspond to each of the pixel positions in said distortion free image;
   (i) obtaining a plurality of digital images of a subject to be examined;
   (j) correcting, according to the transform table, image distortion in said digital images of said subject by transforming each of said plurality of digital images of said subject to be examined;
   wherein, in said transform table, said each of the center positions of said elements within the imaging view field is made to correspond to one of the pixels in said distortion free image.

10. An X-ray radiography system comprising:
   an X-ray source irradiating a chart with X-rays from an X-ray source, said chart having elements arranged on a straight line with predetermined position relations in each of a plurality of directions;
   an X-ray detection unit for detecting X-rays transmitted through said chart, said X-ray detection unit having an X-ray image intensifier and a television camera for obtaining a digital image of said chart, said chart being arranged such that said straight line is parallel or perpendicular to the scanning lines of said television camera;
   an image processing unit for subjecting data of said digital image of said chart and digital images to be examined in a predetermined phase stage of an electro-cardiographic signal to calculation processing, and
   means for displaying the digital image obtained by said image processing unit;
   wherein said image processing unit includes calculation processing means for:
   (a) calculating a center position of each of said elements in said image of said chart, from a center of each of a profile of said elements in said image of said chart in the horizontal or vertical direction;
   (b) calculating a center position of each of said elements which can not be imaged by said X-ray image intensifier, by extrapolation from the center position of said elements within the imaging view field;
   (c) determining correspondence between said center position of each of said elements obtained in (a) and (b) and a pixel position in an image of said chart obtained by an ideal imaging in which a distortion free image of the image of said chart can be obtained;
   (d) calculating each of pixel positions in said distortion free image by a two-dimensional linear interpolation using said center positions of each of said elements, obtained in (a) and (b);
   (e) preparing a transform table making each of the pixel positions in said image of said chart correspond to each of the pixel positions in said distortion free image;
   (f) correcting, according to the transform table, image distortion in each of digital images of said subject to be examined by transforming each of said digital images of said subject, said digital images of said subject being obtained in said predetermined phase stage of the electro-cardiographic signal; and
   (g) joining a plurality of digital images thus corrected to each other;
   wherein, in the transform table, said each of the center positions of said elements within the imaging view field is made to correspond to one of the pixels in said distortion free image,
   wherein said images of said subject are obtained, putting each of a single lung and the mediastinum of said subject to be examined in said imaging view field of said X-ray detection unit, and
   wherein a synthesized image is obtained by joining said plurality of images, for which image distortion is corrected, so that portions included in common in corrected images are in accordance with each other.

11. An X-ray radiography system according to claim 10, wherein said television camera of said X-ray detection unit has a semiconductor element for an imaging element.

* * * * *